3,258,465
N-TETRAZOLE, TRIAZOLE AND OXADIAZOL-BENZYL-N'-METHYL - HYDRAZINES AND INTERMEDIATES THEREFOR
Roland Jaunin, Basel, and Paul Zeller, Allschwil, Switzerland, assignors to Hoffmann-La Roche Inc., Nutley, N.J., a corporation of New Jersey
No Drawing. Filed Feb. 27, 1964, Ser. No. 347,690
Claims priority, application Switzerland, Mar. 4, 1963, 2,717/63
11 Claims. (Cl. 260—307)

This invention relates to novel pharmaceutically useful heterocyclic compounds, as well as to intermediates therefor. More particularly, this invention relates to novel cytostatic compounds selected from the group consisting of compounds of the formula

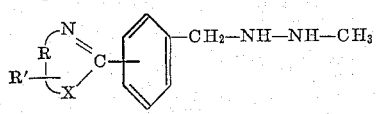

(I)

and salts thereof wherein X is selected from the group consisting of oxygen and nitrogen; R represents a linkage of 2 atoms completing a 5-membered heterocyclic aromatic ring, said 2 atoms being selected from the group consisting of carbon, nitrogen and oxygen; and R' is linked to the heterocyclic moiety and is selected from the group consisting of hydrogen, lower alkyl, hydroxy, p-(2-methylhydrazino)-methylphenyl, phenyl and halomethyl.

Compounds of Formula I above form pharmaceutically acceptable acid addition salts with both inorganic and organic pharmaceutically acceptable, acids, such as hydrohalic acids, e.g., hydrochloric acid, hydrobromic acid, hydroiodic acid; with other mineral acids, e.g., sulfuric acid, phosphoric acid and the like; and with organic acids, e.g., tartaric acid, citric acid, oxalic acid, camphor-sulfonic acid, ethane-sulfonic acid, toluene-sulfonic acid, mandelic acid and the like. Especially preferred salts are the hydrohalides (especially the hydrochlorides and hydrobromides) and the oxalates.

The acid addition salts are preferably manufactured in an inert solvent by treatment of the hydrazine derivative with the appropriate acid. Acid addition salts which are not pharmaceutically acceptable (i.e., with non-pharmaceutically acceptable acids) can be converted to pharmaceutically acceptable acid addition salts via a conventional metathetic reaction with a compound yielding the anion of a pharmaceutically acceptable acid addition salt.

The 5-membered heterocyclic aromatic ring in the compounds of Formula I of which the moiety R is part, can, for example, be an oxadiazol-3-yl moiety which, when R' is other than hydrogen, is substituted, for example, 5-methyl-1,2,4-oxadiazol-3-yl, 5-trifluoromethyl-1,2,4-oxadiazol-3-yl, 5-hydroxy-1,2,4-oxadiazol-3-yl, and 5-[p - (2-methylhydrazino)-methylphenyl]-1,2,4-oxadiazol-3-yl. Said 5-membered heterocyclic aromatic ring can also be, for example, an oxadiazol-5-yl which can be substituted, for example, 3-phenyl-1,2,4-oxadiazol-5-yl or 3-methyl-1,2,4-oxadiazol-5-yl. Thus, when the moiety R completes as the 5-membered heterocyclic aromatic ring, a 1,2,4-oxadiazol ring, then such compounds of Formula I could be of the formula

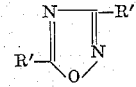

(Ia)

wherein one R' is of the group consisting of (2-methylhydrazino)-methylphenyl and the other R' has the same meaning as in Formula I. Similarly representative of the 5-membered heterocyclic aromatic rings which can be completed by the moiety R in Formula I, are the triazol-5-yl and the tetrazol-5-yl rings, which, when R' in Formula I is other than hydrogen, are substituted, for example, 3-hydroxy-1,2,4-triazol-5-yl, 4-isopropyl-tetrazol-5-yl or the like.

Compounds of Formula I containing such triazolyl or tetrazolyl moieties can be represented by the formulae

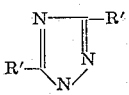

(Ib)

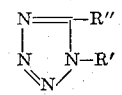

(Ic)

wherein in Formula Ib one R' is (2-methylhydrazino)-methylphenyl and the other R' has the same meaning as in Formula I; and wherein in Formula Ic, R'' is (2-methylhydrazino)-methylphenyl and R' has the same meaning as in Formula I.

Especially preferred compounds are those of Formula I in which the 5-membered heterocyclic aromatic ring completed by the moiety R is 1,2,4-oxadiazol-3-yl or 1,2,4-oxadiazol-5-yl. Said ring configurations together with the meaning of R' as lower alkyl (especially methyl) or dichloromethyl, are especially preferred. Thus, exemplary of the preferred embodiments of substituted 5-membered heterocyclic aromatic ring substituents are 5-methyl-1,2,4-oxadiazol-3-yl, 5-dichloromethyl-1,2,4-oxadiazol-3-yl and 3-methyl-1,2,4-oxadiazol-5-yl.

As used herein, the term "lower alkyl" comprehends both straight and branched chain saturated hydrocarbon radicals, such as, methyl, ethyl, propyl, isopropyl and the like. Also, as used herein, the term "halomethyl" comprehends a methyl substituent, one or more of the hydrogen atoms of which are replaced by halogen, for example, a dihalomethyl substituent, such as, dichloromethyl, or a trihalomethyl substituent, such as, trifluoromethyl. The terms "halo," "halogen" and "halide," accordingly comprehend all four halogens, i.e., iodo, chloro, bromo and fluoro (the latter three being preferred).

In addition to those configurations specified above, also especially preferred are compounds of Formula I, including compounds of Formulae Ia, Ib and Ic, wherein the 5-membered heterocyclic aromatic ring is para to the methylhydrazinomethyl substituent on the phenyl ring.

The compounds of Formula I can be prepared from novel intermediates of the formula

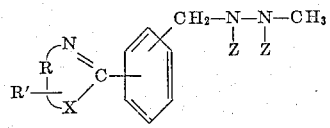

(II)

wherein R and R' have the same meanings as in Formula I, and Z is arylalkoxycarbonyl, via splitting off the moiety represented by Z and, if desired, converting the so-obtained hydrazino compounds into acid addition salts. As exemplary of arylalkoxycarbonyl, there can be cited moieties wherein the aryl residue is phenyl and the alkoxy moiety is lower alkoxy, for example, carbobenzoxy.

The compounds of Formula II can be prepared, for example, by reacting a compound which already contains some of the atomic elements of the structure of the 5-membered aromatic heterocyclic ring with reactants supplying the other atomic elements, thereby forming the desired 5-membered heterocyclic aromatic ring, in certain cases already bearing the substituents represented by R' in Formula I.

If, for example, an acetyl halide or acetic anhydride is reacted with a (2-methylhydrazino)-methyl-benzamidoxime, the hydrazino-nitrogen atoms of which are protected by an arylalkoxycarbonyl residue (represented by Z in Formula II above) then there is obtained a compound of Formula II which, as the heterocyclic substituent, contains a 5-methyl-1,2,4-oxadiazol-3-yl moiety.

When a (2-methylhydrazino)-methyl-benzamidoxime, the hydrazino-nitrogen atoms of which are protected by an arylalkoxycarbonyl residue, is reacted with a halogenated acetyl halide or acetic anhydride, there is obtained a compound of Formula II containing a 5-halomethyl-1,2,4-oxadiazol-3-yl heterocyclic ring. On the other hand, by reacting such benzamidoximes with a chloro-formic acid ester, there is obtained a compound of Formula II with a 1,2,4-oxadiazol-5-one-3-yl moiety. The use of the suffix "one" herein as a substituent or the heterocyclic aromatic ring refers to the enolic form of a compound bearing a hydroxy substituent at said position. Thus, "1,2,4-oxadiazol-5-one-3-yl" and "5-hydroxy-1,2,4-oxadizol-3-yl" refer to the same moiety.

Besides the protected (2-methylhydrazino)-methyl-benzamidoxime indicated above, acetamidoxime or benzamidoximes can also be used as starting materials. Thus, acetamidoxime or benzamidoximes can be reacted with a (2-methylhydrazino)-methyl-benzoyl halide, the nitrogen atoms of the hydrazino moiety of which are protected by arylalkoxycarbonyl residues represented by symbol Z in Formula II above. There are thus obtained compounds of Formula II which, as the 5-membered heterocyclic aromatic ring, contain a 1,2,4-oxadiazol-5-yl moiety which is substituted in the 3-position by methyl (when acetamidoxime is condensed with the benzoyl halide starting material), phenyl (when benzamidoxime is condensed with the benzoyl halide starting material) or a protected (2-methylhydrazino)-methyl-phenyl residue (when a (2-methylhydrazino)-methyl-benzamidoxime is condensed with the benzoyl halide starting material).

By reaction of a (2-methylhydrazino)-methyl-benzoyl halide, protected as described above, with dicyandiamide in the presence of hydrazine hydrate, there is obtained a compound of Formula II wherein the 5-membered heterocyclic aromatic ring is a 1,2,4-triazole-5-one-3-yl moiety. In yet another embodiment, hydrazoic acid can be reacted with a (2-methylhydrazino)-methyl-benzamidoxime-lower alkylimino chloride whereby there is obtained a compound of Formula II wherein the 5-membered aromatic heterocyclic ring is a 1-lower alkyl-tetrazol-yl moiety. For example, reaction of hydrazoic acid with a (2-methylhydrazino)-methyl-benzisopropylimino chloride would yield a compound of Formula II containing a 1-isopropylimino-tetrazol-yl moiety.

The arylalkoxycarbonyl protecting group represented by the compounds of Formula II can be split off in a manner known per se, for example, by hydrogenolysis or by acidolysis.

The hydrogenolysis is conveniently carried out with catalytically activated hydrogen. Palladium black is preferably used as the catalyst.

The acidolysis is, for example, carried out in the presence of a hydrohalic acid in a lower carboxylic acid, preferably in the presence of hydrogen bromide in glacial acetic acid.

The novel compounds of Formula I above are active cytostatically. They inhibit the growth of transplantable tumors in mice and rats. Thus, the compounds of Formula I and the pharmaceutically acceptable acid addition salts thereof are useful as cytostatic agents. For example, they inhibit the growth of the Walker-tumor of the rat, the Ehrlich carcinoma of the mouse, the Ehrlich-ascites carcinoma of the mouse, and others.

The compounds of Formula I and the pharmaceutically acceptable acid addition salts can be administered enternally or parenterally (with dosage adjusted to individual requirements) in admixture with conventional pharmaceutical organic or inorganic inert carriers such as water, gelatin, lactose, starch, magnesium stearate, talc, vegetable oils, gums, olein alcohols, vaseline and the like. They can be administered in the form of conventional pharmaceutical preparations in conventional forms. Thus, they may be in liquid or solid forms, for example, tablets, suppositories, capsules, solutions, suspensions, emulsions, or the like. They can be sterilized, and/or contain conventional additive materials such as preservatives, stabilizing agents, emulsifiers, salts for adjusting of osmotic pressure or buffers. The pharmaceutical preparations can also contain other therapeutically valuable materials.

The following examples are illustrative but not limitative of the invention. All temperatures are stated in ° C.

*Example 1*

115 g. of 5-methyl-3-[p-[(2-methyl-1,2-dicarbobenzoxy-hydrazino)-methyl]-phenyl]-1,2,4-oxadiazole are dissolved in 100 ml. of glacial acetic acid and mixed with 300 ml. of a solution of 33 percent hydrobromic acid in glacial acetic acid. The mixture is protected against the entry of moist air by a calcium chloride tube and remains standing for 2 hours at room temperature, with occasional agitation, until the reaction dies down. The precipitate is filtered off and rejected. After the addition of 300 ml. of absolute ether, 5-methyl-3-[p-[(2-methyl-hydrazino)-methyl]-phenyl]-1,2,4-oxadiazole hydrobromide separates from the filtrate, is separated off, washed with absolute ether and dried for 24 hours in a desiccator in vacuum over caustic potash. Subsequently the so-formed hydrobromide is dissolved in 50 ml. of ice-water for further purification and treated with a small excess of solid caustic soda under nitrogen gasification. The organic base which separates out is taken up in methylene chloride. The solid residue which remains behind after evaporation of the solvent is dissolved in 140 ml. of absolute ethyl alcohol and treated with a solution of 7 g. of anhydrous oxalic acid in 40 ml. of absolute ethyl alcohol. The precipitated oxalate is filtered off, washed with ethyl alcohol and dried in a vacuum. The 5-methyl-3-[p-[(2-methylhydrazino)-methyl]-phenyl]-1,2,4-oxadiazole-oxalate melts at 190–193° under decomposition. 7.8 g. of the oxalate so-obtained are dissolved in 110 ml. of boiling water and treated with a solution of 6 g. of barium chloride in 24 ml. of water. The barium oxalate which separates out in the cold in an ice-bath is separated by filtration. The filtrate is concentrated to dryness under diminished pressure. The residue is taken up in 50 ml. of boiling methyl alcohol. The solution remains, after cooling, for several hours in a refrigerator. The barium oxalate and excess barium chloride which still precipitate out are separated off and washed with a small amount of absolute methyl alcohol. The filtrate is treated with 200 ml. of ether. 5-methyl-3-[p-[(2-methylhydrazino) - methyl]phenyl]-1,2,4-oxadiazole hydrochloride spontaneously precipitates in the form of colorless, slightly hygroscopic crystals melting at 178–180°. It can be raised however to 180–182° by recrystallization of the product from a mixture of absolute methyl alcohol/ether.

The 5-methyl-3-[p-[(2-methyl - 1,2,4-dicarbobenzoxy-hydrazino)-methyl]-phenyl]-1,2,4-oxadiazole employed as the starting compound can be manufactured in the following way, for example: 17.36 g. of hydroxylamine hydrochloride in 150 ml. of ethyl alcohol are treated with a solution of 12.8 g. of sodium carbonate in 175 ml. of water. To this mixture is added dropwise within 15 minutes, a solution of 107.25 g. of p-(2-methyl-1,2-dicarbobenzoxyhydrazino)-methyl-benzonitrile dissolved in 450 ml. of ethyl alcohol. Subsequently, after the addition of 200 ml. of ethyl alcohol, the reaction mixture is heated at reflux for 18 hours. The solution, after cooling, is evaporated to dryness under diminished pressure. The oil which remains behind is taken up in 200 ml. of ethyl alcohol resulting in the precipitation of sodium chloride in small amounts, which is filtered off. The filtrate is again concentrated to dryness at normal pressure. The residual oily p-(2-methyl-1,2-dicarbobenzoxyhydrazino)-methyl-benzamidoxime is directly further worked up as follows:

107 g. of this amidoxime are dissolved in 350 ml. of anhydrous acetone and treated with 32 g. of anhydrous potassium carbonate. Subsequently, within 70–80 minutes at 10–15° while stirring, a solution of 18.5 g. of acetyl chloride in 120 ml. of anhydrous acetone is added dropwise. The reaction mixture is subsequently stirred for a further 2 hours at room temperature, then filtered and evaporated to dryness under diminished pressure. The oil which remains behind is taken up in 250 ml. of absolute toluene and heated at reflux for 3 hours. The water which forms is separated with the aid of a water-separator. After cooling, the solution is evaporated to dryness under diminished pressure, the 5-methyl-3-[p-[(2-methyl - 1,2 - dicarbobenzoxyhydrazino) - methyl] phenyl]-1,2,4-oxadiazole separates as an almost colorless oil.

Example 2

50 g. of 5-trifluoromethyl-3-[p-[(2-methyl-1,2-dicarbobenzoxyhydrazino)-methyl]-phenyl]-1,2,4-oxadiazole are dissolved in 50 ml. of glacial acetic acid and treated with 200 ml. of a 33 percent hydrogen bromide solution in glacial acetic acid. The reaction mixture is protected against the entry of atmospheric moisture by a calcium chloride tube and remains standing with gentle agitation for 2 hours at room temperature until the reaction has died down. 50 ml. of absolute ether is then added and the 5-trifluoromethyl-3-[p-[(2-methylhydrazino)-methyl]-phenyl] - 1,2,4 - oxadiazole-hydrobromide which separates is filtered off 15 minutes after the addition and washed with absolute ether and dried for 24 hours in a desiccator over caustic potash. The so-obtained crude hydrobromide is subsequently dissolved in 80 ml. of cold water and adjusted to a pH of 6–7 by the dropwise addition of β-aminoethanol. The solution is warmed to 40°, filtered after the addition of a small amount of filter aid, and treated with a solution of 11 g. of oxalic acid in 25 ml. of warm water. From the solution, which was clear at the boiling temperature, there crystallizes out after a few hours, after cooling and storing in a refrigerator, an almost white 5-trifluoromethyl-3-[p-[(2-methylhydrazino)-methyl] - phenyl] - 1, 2,4-oxadiazole oxalate. The compound melts at 197–198° under decomposition.

The starting material is formed as follows: 50 g. p-(2-methyl-1,2-dicarbobenzoxyhydrazino) - methyl-benzamidoxime employed as the starting compound is heated at reflux for 2 hours with 20 g. of trifluoro-acetic acid anhydride in 250 ml. of absolute toluene. After replacing the reflux condenser by a water-separator, the reaction mixture is heated at reflux for a further 2 hours. The water which forms is continuously removed. The reaction solution is filtered after cooling, and the filtrate evaporated under diminished pressure. The 5-trifluoromethyl-3-[p-[(2-methyl-1,2 - dicarbobenzoxyhydrazino) methyl]-phenyl]-1,2,4-oxadiazole which remains behind is an almost colorless oil.

Example 3

58 g. of 5-dichloromethyl-3-[p-[(2-methyl-1,2-dicarbobenzoxyhydrazino)-methyl]-phenyl] - 1,2,4-oxadiazole are treated in the same manner as in Example 2 with 200 ml. of a solution of 33 percent hydrogen bromide in glacial acetic acid. The resulting crude 5-dichloromethyl-3-[p-[(2-methylhydrazino) - methyl] - phenyl]-1, 2,4-oxadiazole hydrobromide is dissolved in 55 ml. of cold water. The crystallization which is induced by scratching, can be further completed by permitting the solution to stand for several hours in a refrigerator. The powdery crystallizate which separates is isolated, washed with a small amount of ice-water and dried in a vacuum desiccator. For further purification, the so-obtained hydrobromide is subsequently agitated for a further 1 hour with 250 ml. of ether, filtered and washed with ether. The almost colorless crystal-powder melts at 173–175°.

5-dichloromethyl - 3 - [p[(2-methyl-1,2-dicarbobenzoxyhydrazino)-methyl]-phenyl]-1,2,4-oxadiozole can be obtained, for example, according to the procedure of Example 2, by reacting 50 g. of p-(2-methyl-1,2-dicarbobenzoxyhydrazino)-methyl-benzamidoxime with 14 g. of dichloro-acetyl chloride.

Example 4

60 g. of 3-[p-[(2-methyl-1,2-dicarbobenzoxyhydrazino)-methyl]-phenyl]-1,2,4-oxadiazol-5-one is converted into 3-[p-[(2-methylhydrazino)-methyl]-phenyl] - 1,2,4-oxadiazol-5-one hydrobromide by the action of 200 ml. of a 33 percent hydrogen bromide solution in glacial acetic acid under the conditions given in Example 2. The crude hydrobromide is very hygroscopic; it is washed with absolute ether and dried for 24 hours in a vacuum-desiccator over caustic potash. By digestion with 70 ml. of absolute methyl alcohol the slightly resinous hydrobromide is converted into a powdery product. This is again converted into a paste with 50 ml. of absolute ether, filtered, washed with a small amount of ether, dissolved in 80 ml. of absolute methyl alcohol at the boiling temperature and precipitated with 40 ml. of absolute ether. The almost colorless hydrobromide melts at 218–220° under decomposition.

The 3 - [p-[(2-methyl-1,2-dicarbobenzoxyhydrazino)-methyl]-phenyl]-1,2,4-oxadiazol-5-one employed as the starting material can be manufactured, for example, in the following way:

55 g. of p-(2-methyl-1,2-dicarbobenzoxyhydrazino)-methylbenzamidoxime are heated at reflux for 14 hours with 13.6 g. of chloroformic acid ethyl ester in 300 ml. of absolute toluene. The solution which clarifies after cooling is evaporated to dryness under diminished pressure. 3 - [p-[(2-methyl-1,2-dicarbobenzoxyhydrazino)-methyl]-phenyl]-1,2,4-oxadiazol-5-one remains behind as a yellowish oil.

Example 5

49 g. of 3,5-bis[p-[(2-methyl-1,2-dicarbobenzoxyhydrazino)-methyl]-phenyl]-1,2,4-oxadiazole is transformed into the 3,5-bis[p-[(2-methylhydrazino)-methyl]-phenyl]-1,2,4-oxadiazole hydrobromide according to the procedure of Example 2 with the aid of 200 ml. of a 33 percent solution of hydrogen bromide in glacial acetic acid. The so-obtained hydrobromide, an almost colorless crystal-powder, after recrystallization from absolute methylalcohol, melts at 255–256° under decomposition.

The 3,5-bis-[p-[(2 - methyl-1,2-dicarbobenzoxyhydrazino)-methyl]-phenyl]-1,2,4-oxadiazole used as the starting material can be manufactured, for example, in the following way:

23.1 g. of p-(2-methyl-1,2-dicarbobenzoxyhydrazino)-methylbenzamidoxime and 23.3 g. of p-(2-methyl-1,2-dicarbobenzoxyhydrazino)-methyl-benzoyl chloride are dissolved in 200 ml. absolute toluene and subsequently heated at reflux for 4 hours. The water which forms is continuously removed. The further working up is effected according to the procedure in Example 2. 3,5-bis [p-[(2 - methyl-1,2-dicarbobenzoxy-hydrazino)-methyl]-phenyl]-1,2,4-oxadiazole precipitates as an almost colorless oil.

Example 6

26 g. of 3-phenyl-5-[p-[(2-methyl-1,2-dicarbobenzoxyhydrazino)- methyl]-phenyl]-1,2,4-oxadiazole are treated according to the procedure of Example 2 with 120 ml. of a 33 percent solution of hydrogen bromide in glacial acetic acid and subsequently worked up as indicated in Example 2. The 3-phenyl-5-[p-[(2-methyl-hydrazino)-methyl]-phenyl]-1,2,4-oxadiazole hydrobromide is recrystallized from 150 ml. of absolute methyl alcohol. The colorless crystallizate melts at 203–204° under decomposition.

The 3 - phenyl-5-[p-[(2-methyl-1,2-dicarbobenzoxyhydrazino)-methyl]-phenyl]-1,2,4-oxadiazole starting material can, for example, be obtained in the following way: 23.3 g. of p-(2-methyl-1,2-dicarbobenzoxyhydrazino)-methyl-benzoyl chloride and 6.8 g. of benzamidoxime are heated at reflux for 5 hours in 150 ml. of toluene. The water which forms is removed with the aid of a water-separator. The 3 - phenyl-5-[p-[(2-methyl-1,2-dicarbobenzoxyhydrazino)-methyl]-phenyl]-1,2,4, - oxadiazole which precipitates as an almost colorless oil is isolated corresponding to the procedure of Example 2.

*Example 7*

27 g. of 3-methyl-5-[p-[(2-methyl-1,2-dicarbobenzoxyhydrazino)-methyl] - phenyl]-1,2,4-oxadiazole are converted into 3-methyl-5-[p-[(2-methyl-hydrazino)-methyl]-phenyl]-1,2,4-oxadiazole hydrobromide according to the procedure given in Example 2 by the action of 120 ml. of a 33 percent hydrogen bromide solution in glacial acetic acid. 6.5 g. of this hydrobromide, recrystallized once from methyl alcohol/ether, are dissolved in cold water. The solution is adjusted to a pH of 6–7 by the dropwise addition of β-aminoethanol, filtered after the addition of a small amount of filter aid and treated with 4 g. of crystallized oxalic acid. The solution, which is clear while warm, after cooling and storing in a refrigerator, precipitates out an almost colorless 3-methyl-5-[p-[(2 - methyl-hydrazino)-methyl]-phenyl] - 1,2,4-oxadiazole oxalate which melts at 199–200° under decomposition.

The 3-methyl-5-[p[(2-methyl-1,2-dicarbobenzoxy-hydrazino)-methyl]-phenyl]-1,2,4-oxadiazole employed as the starting material can be manufactured, for example, in the following way: 23.3 g. of p-(2-methyl-1,2-dicarbobenzoxy-hydrazino)-methyl-benzoyl chloride are heated at reflux for 3 hours with 5.6 g. of acetamidoxime hydrochloride in 150 ml. absolute toluene. The water which forms is removed with the aid of a water-separator. After the generation of water diminishes, 5 g. of anhydrous sodium carbonate is added and the reaction mixture is heated at reflux for a further 3 hours. Subsequently, the 3 - methyl-5-[p-[(2-methyl-1,2-dicarbobenzoxy-hydrazino)-methyl]-phenyl]-1,2,4-oxadiazole is isolated as a yellowish oil according to the procedure given in Example 2.

*Example 8*

According to the procedure of Example 2, 9 g. of 3-[p-[(2-methyl-1,2-dicarbobenzoxy-hydrazino)- methyl]-phenyl]-1,2,4-triazol-5-one in 10 ml. of glacial acetic acid are treated with 40 ml. of a 33 percent solution of hydrogen bromide in glacial acetic acid. The precipitated crude 3-[p-[(2-methyl-hydrazino)-methyl]-phenyl]-1,2,4-triazol-5-one hydrobromide is stirred for a half hour in 100 ml. of absolute ethyl alcohol with vigorous stirring, treated with 50 ml. of absolute ether, filtered off and washed with ether. The light-yellow colored hydrobromide melts at 170–175° under decomposition. The analysis corresponds to the sum-formula:

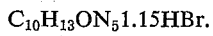

$C_{10}H_{13}ON_5 \cdot 1.15HBr$.

The 3-[p-[(2-methyl-1,2-dicarbobenzoxy-hydrazino)-methyl]-phenyl]-1,2,4-triazol-5-one employed as the starting material can be manufactured, for example, as follows: 6 g. of potassium hydroxide are dissolved in 20 ml. of water at 20° and treated with 5.3 g. of dicyandiamide. After the addition of 25 ml. of acetone, the mixture is cooled down to 0°. Subsequently a solution of 23.3 g. of p-(2-methyl-1,2-dicarbobenzoxyhydrazino)-methyl-benzoyl chloride in 25 ml. of acetone is added dropwise within 1 hour, at a temperature between 0 and 5°. After an increase of temperature to 15°, the reaction mixture is treated with 160 ml. of water, whereby the solution warms up. After the evolution of heat diminishes, 3.8 ml. of glacial acetic acid are added dropwise at 15° with vigorous stirring. Overnight there separates a viscous oil, which is then separated from the mixture by decantation and washed twice with water. The oil is dissolved in 150 ml. of methylene chloride and the solution is completely dried over anhydrous sodium sulphate and evaporated under diminished pressure. The p - (2 - methyl - 1,2 - dicarbobenzoxy-hydrazino)-methyl-benzoyl dicyandiamide obtained is a viscous oil. 10.5 g. of this compound are dissolved in 30 ml. of ethyleneglycol monomethyl ether and treated with a solution of 1.05 g. of hydrazine hydrate in 30 ml. of water with brisk stirring. With warming, there forms a very viscous oil which sets immediately. Subsequently, the reaction product is treated at reflux for approximately 30 minutes until complete solution is obtained. The viscous product which separates on cooling is introduced into 200 ml. of ice-water with vigorous stirring and washed out several times by decantation. The semi-crystalline pasty mass which forms is dissolved in 100 ml. of methylene chloride. The solution is dried over anhydrous sodium sulphate and evaporated in a vacuum. The residual 3-[p-[(2 - methyl - 1,2 - dicarbobenzoxyhydrazino) - methyl]-phenyl]-5-ureido-triazole is converted into the corresponding triazol-5-one via acid hydrolysis which effects splitting of the ureido moiety.

*Example 9*

36 g. of 1-isopropyl-5-[p-[(2-methyl-1,2-dicarbobenzoxyhydrazino)-methyl]-phenyl]-1,2,3,4-tetrazole are dissolved in 250 ml. of absolute methyl alcohol and hydrogenated at normal temperature and normal pressure in the presence of 5 g. of a 5 percent palladium carbon. The hydrogenation comes to a standstill after the uptake of 3.8 l. of hydrogen. The catalyst is filtered off under nitrogen gasification, the filtrate is evaporated to dryness under diminished pressure after the addition of 9.2 ml. of a 28 percent solution of hydrogen chloride in methanol. The so-obtained crude 1-isopropyl-5-[p-[(2-methyl-hydrazino)-methyl]-phenyl]-1,2,3,4-tetrazole hydrochloride is a colorless oil. It is dissolved in about 60 ml. of water. The solution is subsequently shaken thoroughly with methylene chloride and the methylene chloride extract rejected. The organic base is liberated under nitrogen gasification by the cautious addition of an aqueous solution of caustic soda, and then extracted with methylene chloride. After removal of the solvent, the separated oil is taken up in 75 ml. of absolute ethyl alcohol and treated with a solution of 5 g. of anhydrous oxalic acid in 25 ml. of absolute ethyl alcohol. The reaction mixture is heated to boiling for a short time and cooled down. The separated colorless 1-isopropyl-5-[p-[(2-methyl-hydrazino)-methyl]-phenyl]-1,2,4-tetrazole oxalate is washed with ethyl alcohol. After drying, it melts at 183–185° under decomposition.

The 1-isopropyl-5-[p-[(2-methyl-1,2-dicarbobenzoxyhydrazino)-methyl]-phenyl]-tetrazole employed as the starting product can be manufactured, for example as follows: 34.3 g. of p-(2-methyl-1,2-dicarbobenzoxyhydrazino)-methyl-benz-isopropylamide are treated with 10 g. of thionyl chloride and warmed on the water-bath up to the termination of the evolution of hydrogen chloride (1½ hours). The excess thionyl chloride is subsequently removed at 40° under diminished pressure. For the complete removal of thionyl chloride residues which still remain, the reaction mixture is taken up three times in 80 ml. of benzene and evaporated to dryness at 40° under diminished pressure. The p-(-methyl-1,2-dicarbobenzoxyhydrazino) - methyl - benz - isopropylimino chloride which remains behind as a yellow oil is taken up in 20 ml. of absolute chloroform and treated with a solution of 0.077 mol. hydrazoic acid in absolute chloroform. The reaction mixture is left standing at room temperature until the evolution of hydrogen chloride substantially ceases (60–70 hours). The excess hydrazoic acid is removed by warming the reaction mixture on the water-bath in a conduit with a good exhauster. Subsequently, the solution is evaporated to dryness under diminished pressure. There remains behind, 1-isopropyl-5-[p-[(2-methyl - 1,2 - dicarbobenzoxy - hydrazino) - methyl]-phenyl]-1,2,4-tetrazole as a viscous, almost colorless oil.

*Example 10*

As described below, capsules containing the following compounds were prepared:

|  | Mg. |
|---|---|
| 5 - methyl - 3 - {p-[(2-methylhydrazino)-methyl]-phenyl}-1,2,4-oxadiazole hydrochloride | 25 |
| Mannitol | 90 |
| Talc | 5 |
|  | 120 |

The active ingredient was homogenized with the talc and mannitol, passed through a No. 5 sieve (mesh width about 0.23 mm.) and the mixture once again mixed. The mixture was then filled into No. 4 gelatin capsules.

*Example 11*

As described below, dragées were prepared:

| Nucleus: | Mg. |
|---|---|
| 3 - {p - [(2 - methylhydrazino)-methyl]-phenyl}-1,2,4-oxadiazole-5-one hydrobromide | 50 |
| Mannitol | 80 |
| Talc | 5 |
| Corn starch | 15 |
|  | 150 |

| Coating: | |
|---|---|
| Sugar, 90% | |
| Rice starch, 5% | 150 |
| Talc, 5% | |

| Nucleus weight | 150 |
|---|---|
| Coating weight | 150 |
|  | 300 |

The active ingredient was mixed with the mannitol and passed through a No. 5 sieve (mesh width about 0.23 mm.). The corn starch was then heated with water to a 10% paste. The pluverized mixture was then homogenized by grinding with this paste. The slightly wet mass was then granulated by means of a No. 3 sieve (mesh width about 1.0 mm.). The granules were then dried and mixed with the talc. The so-obtained compressible mixture was pressed into bi-convex kernels of 150 mg. weight. The kernels possess a diameter of approximately 8.0 mm.

These kernels were then coated according to the usual coating method with the above sugar syrup till the end weight of 300 mg. was obtained.

*Example 12*

As described below, dragées were prepared:

| Nucleus: | Mg. |
|---|---|
| 3 - phenyl - 5 - {p - [(2 - methylhydrazino)-methyl]-phenyl}-1,2,4 - oxadiazol hydrobromide | 25.0 |
| Mannitol | 60.0 |
| Talc | 5.0 |
| Corn starch | 10.0 |
|  | 100.0 |

| Coating: | |
|---|---|
| Sugar, 90% | |
| Rice starch, 5% | 100.0 |
| Talc, 5% | |

| Nucleus weight | 100.0 |
|---|---|
| Coating weight | 100.0 |
|  | 200.0 |

The preparation of the dragées was according to the procedure described in Example 11.

*Example 13*

Dry ampuls of the following composition were prepared:

|  | Mg. |
|---|---|
| 3 - {p-[(2-methylhydrazino)-methyl]-phenyl}-1,2,4-triazol-5-one hydrobromide | 250 |
| Dextran | 245 |
| Sodium pyrosulphite | 5 |
| Nipagin | 2 |
| Nipasol | 0.25 |
| Distilled water, ad 2.5 ml. | |

The above composition was filled into ampuls (brown glass), in 5 mg. portions, which were then under a carbon dioxide atmosphere, subjected to drying.

We claim:

1. A compound selected from the group consisting of compounds of the formula and salts thereof wherein X is selected from the group consisting of oxygen and nitrogen;

R represents a linkage of 2 atoms completing a triazole, tetrazole or oxadiazole ring;

R' is linked to the heterocyclic moiety and is selected from the group consisting of hydrogen, lower alkyl, hydroxy, p-(2-methylhydrazino)-methylphenyl, phenyl and halomethyl; and Y is selected from the group consisting of hydrogen and phenyl-lower alkoxy-carbonyl.

2. 5 - lower alkyl - 3 - [(2 - methylhydrazino)-methyl-phenyl]-1,2,4-oxadiazole.

3. 5 - methyl - 3 - [p-[(2 - methylhydrazino)-methyl]-phenyl]-1,2,4-oxadiazole.

4. 5 - dichloromethyl - 3 - [(2-methylhydrazino)-methyl-phenyl]-1,2,4-oxadiazole.

5. 5 - dichloromethyl - 3 - [p - [(2 - methylhydrazino)-methyl]-phenyl]-1,2,4-oxadiazole.

6. 3 - lower alkyl - 5 - [(2 - methylhydrazino)-methyl-phenyl]-1,2,4-oxadiazole.

7. 3 - methyl - 5 - [p-[(2 - methylhydrazino)-methyl]-phenyl]-1,2,4-oxadiazole.

8. 3 - [p - [(2 - methyl-1,2-dicarbobenzoxyhydrazino)-methyl]-phenyl]-1,2,4-triazol-5-one.

9. p - (2 - methyl-1,2-dicarbobenzoxyhydrazino)-methyl-benzamidoxime.

10. p - (2 - methyl - 1,2 - dicarbobenzoxyhydrazino)-methyl-benzoyl dicyandiamide.

11. p - (2 - methyl - 1,2 - dicarbobenzoxyhydrazino)-methyl-benz isopropylimino chloride.

No references cited.

HENRY R. JILES, *Acting Primary Examiner.*

R. J. GALLAGHER, *Assistant Examiner.*